(12) United States Patent
Baccouche et al.

(10) Patent No.: US 9,180,829 B1
(45) Date of Patent: Nov. 10, 2015

(54) CARBON FIBER WRAPPED ALUMINUM DUAL TUBE DEFLECTOR

(71) Applicant: Ford Global Technologies, LLC, Dearborn, MI (US)

(72) Inventors: Mohamed Ridha Baccouche, Ann Arbor, MI (US); Matthew John Zaluzec, Canton, MI (US); Rahul Arora, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/482,202

(22) Filed: Sep. 10, 2014

(51) Int. Cl.
*B60R 19/34* (2006.01)
*B60R 19/03* (2006.01)

(52) U.S. Cl.
CPC .................. *B60R 19/34* (2013.01); *B60R 19/03* (2013.01)

(58) Field of Classification Search
CPC ......... B60R 19/03; B60R 19/34; B62D 25/08
USPC ............... 296/187.09, 187.1, 193.09, 203.02; 293/133
See application file for complete search history.

(56) References Cited

U.S. PATENT DOCUMENTS

| 5,419,416 | A | 5/1995 | Miyashita et al. |
| 5,819,408 | A | 10/1998 | Catlin |
| 6,957,846 | B2 | 10/2005 | Saeki |
| 7,819,218 | B2 | 10/2010 | Eichberger et al. |
| 8,398,153 | B1 * | 3/2013 | Dandekar et al. ........ 296/187.09 |
| 8,398,154 | B1 | 3/2013 | Nusier et al. |
| 2008/0290674 | A1 * | 11/2008 | Yang et al. ..................... 293/155 |
| 2014/0062106 | A1 | 3/2014 | Han |
| 2014/0084633 | A1 | 3/2014 | Matsuda et al. |
| 2014/0084635 | A1 | 3/2014 | Matsuda et al. |
| 2014/0367981 | A1 * | 12/2014 | Zaluzec et al. ................ 293/121 |
| 2015/0102635 | A1 * | 4/2015 | Barbat et al. ............... 296/187.1 |
| 2015/0158441 | A1 * | 6/2015 | Nusier et al. |

FOREIGN PATENT DOCUMENTS

| CN | 101022977 A | 8/2007 |
| CN | 103359176 A | 10/2013 |
| DE | 102004016839 A1 | 11/2005 |

(Continued)

OTHER PUBLICATIONS

Zarei et al., Crashworthiness Investigation and Optimization of Empty and Foam Filled Composite Crash Box, Aeronautical University, Tehran, Iran; Institute of Machine Elements, Design and Manufacturing, University of Technology, Freiberg, Germany, Published Aug. 2010.

(Continued)

*Primary Examiner* — Jason S Morrow
(74) *Attorney, Agent, or Firm* — Jason Rogers; Brooks Kushman P.C.

(57) ABSTRACT

A deflector for a front end assembly that includes a lower tube having a lower/front leg extending outboard from a bumper and an intermediate leg extending from a lower/outer end of the lower/front leg to a sliding plate that is not attached to a frame rail. The deflector also includes an upper tube including an upper/front leg extending outboard from the bumper and a rear leg extending from an upper/outer end of the upper tube toward that is attached to a rear sliding plate that is also not attached to the frame rail. A method of making a deflector from an aluminum tube that is bent to shape and wrapped with a carbon fiber resin layer.

14 Claims, 4 Drawing Sheets

(56) References Cited

FOREIGN PATENT DOCUMENTS

| | | | |
|---|---|---|---|
| DE | 202014105462 U1 * | 1/2015 | |
| EP | 2540575 A2 | 1/2013 | |
| EP | 2692589 A1 | 2/2014 | |
| WO | 2014069108 A1 | 5/2014 | |
| WO | WO-2014/088117 A1 * | 6/2014 | |

OTHER PUBLICATIONS

Yaghoubi et al., Frontal Impact Responses of Generic Steel Front Bumper Crush Can Assemblies, SAE International, 2014-01-0550, Published Apr. 1, 2014.

* cited by examiner

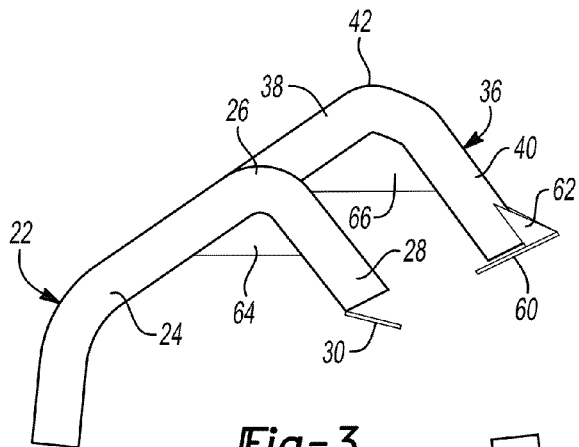
Fig-3
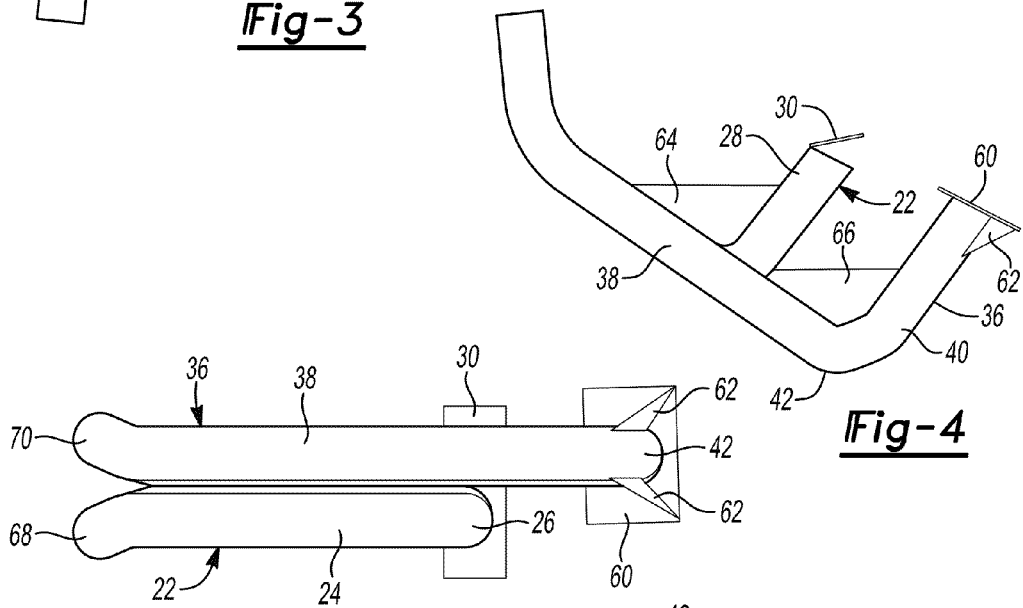
Fig-4
Fig-5
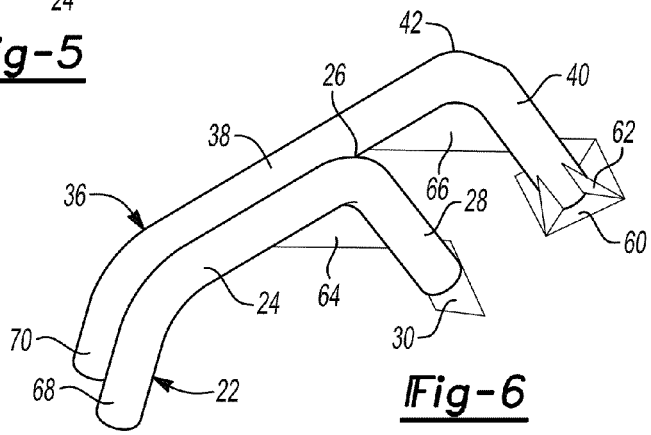
Fig-6

CARBON FIBER WRAPPED ALUMINUM DUAL TUBE DEFLECTOR

TECHNICAL FIELD

This disclosure relates to a deflector for reducing intrusions into the passenger compartment of a vehicle when subjected to a small overlap rigid barrier test and reducing the mass of such deflectors.

BACKGROUND

Land vehicles are tested for crashworthiness by a variety of tests including frontal impacts, side impacts, rear impacts, roll-over and other tests. Frontal impact tests were previously developed that specified that a vehicle impacts a barrier between the frame rails that extend longitudinally relative to the vehicle. In this type of test, the frame rails provided the primary support for the vehicle body. Crush cans located between a front bumper and the frame rails absorb part of the force of the frontal impact to the front bumper. Structures that interfere with compressing crush cans may create problems in achieving successful test results in frontal impact crash tests. The extent of any intrusions into the passenger compartment are measured at the lower hinge pillar, footrest, left toe pan, brake pedal, parking brake pedal, rocker panel, steering column, upper hinge pillar upper dash and left instrument panel.

An Insurance Institute for Highway Safety (IIHS) Small Offset Rigid Barrier test simulates small overlap frontal crashes against a rigid barrier. In the proposed test, the vehicle impacts a rigid barrier having a six inch pole-like radius on one corner with a 40% overlap at 40 MPH. The impact is outboard of the frame rails and the frame rails provide minimum resistance to intrusion into the passenger compartment.

Deflectors that are attached to the outer end of a vehicle bumper have been tested and have reduced intrusions into the passenger compartment. One problem with deflectors that are attached to the front bumper is that they may interfere with or compromise the effectiveness of the crash safety countermeasures in other frontal impact tests. Additional reduction of intrusions in the small overlap rigid barrier (SORB) test results are desired that do not add excessive weight and are cost effective.

This disclosure is directed to solving the above problems and other problems as summarized below.

SUMMARY

According to one aspect of this disclosure, a deflector is disclosed that includes a lower tube and an upper tube. The lower tube includes a lower/front leg extending outboard from a bumper and an intermediate leg extending from a lower/outer end of the lower/front leg to an intermediate sliding plate. The upper tube includes an upper/front leg extending outboard from the bumper and a rear leg extending from an upper/outer end of the upper tube to a rear sliding plate. The intermediate sliding plate and rear sliding plate are configured to slide rearward relative to the frame rail.

According to other aspects of this disclosure, the lower/front leg and upper/front leg may extend rearward from the bumper at an acute angle α relative to the frame rail. The intermediate leg may be straight and may have a first inner end unattached to the frame rail and the rear leg may be straight and may have a second inner end unattached to the frame rail.

The lower tube may include a first aluminum tube that is reinforced with a first carbon-fiber wrap that covers the lower/front leg and the intermediate leg. The upper tube may include a second aluminum tube that is reinforced with a second carbon-fiber wrap that covers the upper/front leg and the rear leg. The lower tube and the upper tube may each include an aluminum tube that is reinforced with a carbon-fiber wrap.

According to other aspects of this disclosure, a front-end assembly for a vehicle is disclosed that comprises a deflector including a front leg attached to a bumper that extends outboard from the bumper and a backing leg extending from an outer end of the front leg toward a frame rail, wherein the front leg and backing leg are portions of an aluminum tube that is covered with a carbon-fiber wrap.

According to other aspects of this disclosure as it relates to the front end assembly, a generally triangular planar brace may be provided that is attached to the front leg and backing leg at an inside angle defined by the front leg and the backing leg. A sliding plate may be attached to a distal end of the backing leg that faces a point mobility bracket that is attached to the frame rail.

The front-end assembly may further comprise a lower tube including a lower/front leg attached to the bumper and an intermediate leg that has a first inner end unattached to the frame rail, and wherein the backing leg has a second inner end unattached to the frame rail. The front-end assembly may further comprise a generally triangular planar brace attached to the lower/front leg and the intermediate leg at an inside angle defined by the lower/front leg and the intermediate leg. A sliding plate may be attached to a distal end of the intermediate leg that faces an outer mid-rail that is attached to the frame rail.

According to another aspect of this disclosure, a method of making a SORB deflector is disclosed that comprises bending an aluminum tube to include a bumper attachment section, a front leg that extends rearward and outwardly from the bumper attachment section to an outer end, and a backing leg that extends rearward from the outer end to a distal end facing a frame rail; welding a sliding plate to the distal end; and wrapping the aluminum tube with a carbon fiber reinforced resin layer.

According to other aspects of this disclosure as it relates to the method, the method may further comprise welding an inner planar brace to an inside angle defined by the front leg and the backing leg.

The method may further comprise bending a lower aluminum tube to include a lower bumper attachment section, a lower/front leg that extends rearward and outwardly from the lower bumper attachment section to a lower/outer end, and an intermediate leg that extends rearward from the lower/outer end to a lower/distal end facing the frame rail; welding a lower sliding plate to the lower/distal end; wrapping the lower aluminum tube with a carbon fiber reinforced resin layer; and assembling the lower aluminum tube to the aluminum tube.

In one alternative embodiment, the method may further comprise welding a lower inner planar brace to an inside angle defined by the lower/front leg and the intermediate leg.

The above aspects of this disclosure and other aspects are described in greater detail below with reference to the attached drawings.

BRIEF DESCRIPTION OF THE DRAWINGS

FIG. 3 is a bottom plan view of a dual deflector tube of FIG. 1;

FIG. 4 is a top plan view of a dual deflector tube of FIG. 1;

FIG. 5 is a side elevation view of a dual deflector tube of FIG. 1;

FIG. 6 is a bottom/side perspective view of a dual deflector tube of FIG. 1;

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
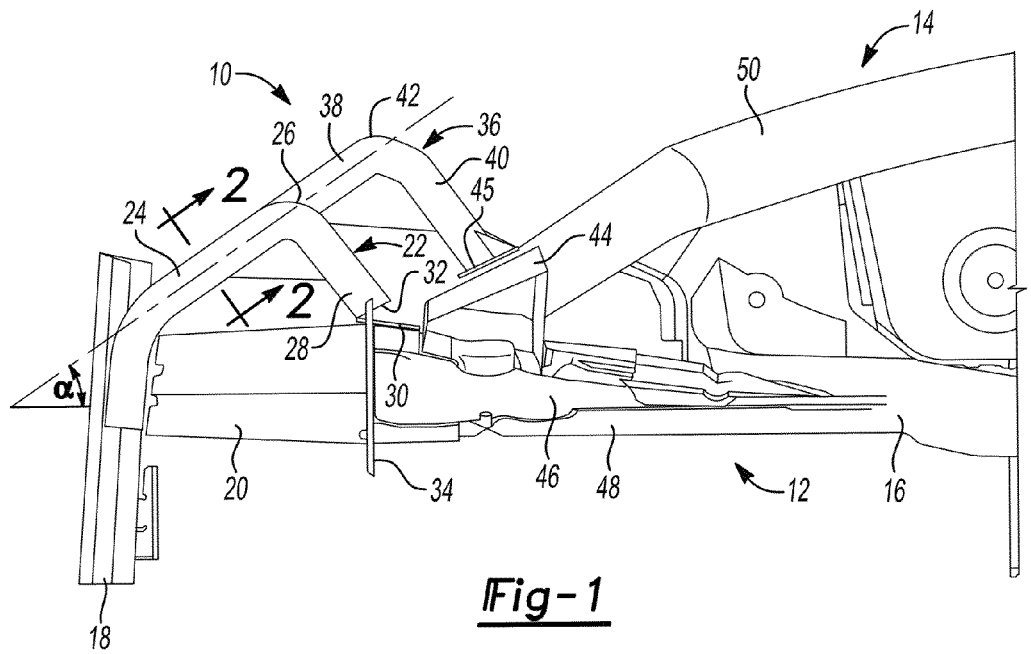
FIG. 1 is a fragmentary bottom plan view of a portion of a front-end of a vehicle including dual deflector tubes having diagonally extending front legs and supporting legs returning towards the frame rail according to one embodiment of this disclosure.

Referring to FIG. 1, a deflector assembly 10 is shown that is part of a front end assembly 12 of a vehicle 14. The front end assembly 12 includes a frame rail 16 that is located behind a bumper 18. A plurality of crush cans 20 are provided between the bumper 18 and the frame rail 16. The crush cans are provided to absorb the impact of a front end collision and are designed to be crushed in a collision to provide crush space and energy absorption.

Front end collision tests were initially developed to test the structure of a vehicle when colliding with a barrier that was located between the frame rail 16 of the vehicle 14. Subsequently, a small offset rigid barrier test has been developed to test the vehicles when colliding with a rigid barrier that is offset so that it contacts the vehicle outside of the frame rails 16.

The deflector assembly 10 includes a lower leg 22. The lower leg 22 includes a lower/inner front leg 24 that extends to a lower/outer end 26. An intermediate leg 28, or backing leg of the lower front leg 24, is provided that extends from the lower/outer end 26 toward the frame rail 16. A sliding plate 30 is provided at a distal end 32 of the lower leg 22. The sliding plate 30 is provided to facilitate rearward sliding movement of the distal end 32 in a longitudinal direction relative to the frame rail 16.

The deflector assembly 10 also includes an upper tube 36. The upper tube 36 includes an upper/front leg 38. The upper/front leg 38 is joined to a rear leg 40, or backing leg of the upper/front leg 38, at an upper/outer end 42 of the upper tube 36. A point mobility bracket 44 is provided on the frame rail 16. A distal end 45 of the upper tube 36 is spaced from, but faces, the point mobility bracket 44. shotgun The frame rail 16 includes an outer mid rail 46 and an inner mid rail 48 that are provided to reinforce the vehicle structure at the front end 12 of the vehicle. A shotgun 50 extends from the frame rail 16 upwardly and outwardly. The shotgun reinforcement 50 is provided to support the front fender and structure of the vehicle around the front wheel.

Figure 2:
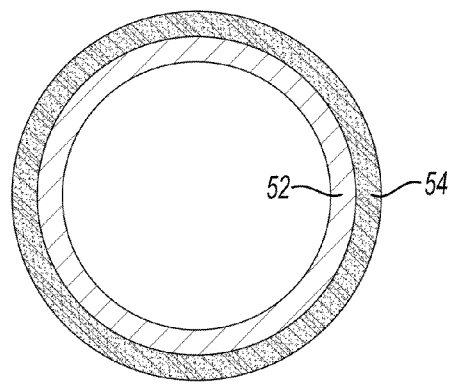
FIG. 2 is a cross-section view taken along the line 2-2 in FIG. 1.

Referring to FIG. 2, a cross-section is taken through the lower leg 22. The lower leg 22 is formed from aluminum tube 52 that is enclosed within a carbon-fiber resin wrap layer 54. The wrapped aluminum tube 52 provides a strong and lightweight base for the deflector assembly 10.

Referring to FIGS. 3-6, the lower leg 22 is shown attached to the upper leg 36. The lower leg 22 includes the lower front leg 24 that extends to the lower outer end 26. The intermediate leg 28 functions as a backing leg for the lower front leg 24 in an impact. The sliding plate 30 is attached to the distal end 32 of the intermediate leg 28. The sliding plate 30 extends in a generally parallel direction relative to the frame rail 16 (shown in FIG. 1). The upper tube 36 includes the upper/front leg 38 and the rear leg 40 that serves as a backing leg for the upper front leg 38. The rear leg 40 is joined to the upper/front leg 38 at an upper/outer end 42. The distal end 45 of the rear leg 40 faces the point mobility bracket 44, but is not connected to the point mobility bracket. The point mobility bracket 44 is attached to the outer mid rail 46 and inner mid rail 48.

A rear sliding plate 60 is provided on the distal end 45 of the rear leg 40. The sliding plate 60 is attached to the distal end 45 and extends in an angle parallel to the angle of the upper front leg 38. The rear sliding plate 60 facilitates rearward sliding movement of the distal end 45 relative to the frame rail in a front end collision. The upper/front leg 38 and lower/front leg 24 extend at an angle α (as shown in FIG. 1) in a laterally outboard direction and in a rearward direction relative to the bumper. The sliding plate 60 is secured to the rear leg 40 by plate reinforcements 62. The plate reinforcements 62, as illustrated, are triangular members that reinforce the connection between the rear leg 40 and the sliding plate 60.

The lower leg 22 includes a lower web plate 64. Lower web plate 64 is a planar triangular member that joins the lower/front leg 24 to the intermediate leg 28. As used herein, the term "triangular plate" or "generally triangular plate" refers to a plate having portions attached to the legs with a side that extends as a hypotenuse between the legs and may have rounded corners. An upper web plate 66 is provided on the upper tube 36. The upper web plate 66 is also a planar triangular member that is welded to the upper/front leg 38 and the rear leg 40. The lower web plate 64 and upper web plate 66 reinforce the lower leg 22 and upper leg 36 so that the generally right angle orientation of the front leg relative to the intermediate leg and the rear leg is maintained in a crash to the extent in a frontal collision without interfering with the function of the crush cans 20. The lower tube 22 includes a lower bumper attachment section 68 that is attached behind the bumper 18. Similarly, an upper bumper attachment section 70 is provided on the upper tube 36. The upper bumper attachment section 70 is also attached to the vehicle behind the bumper 18.

Figure 7:
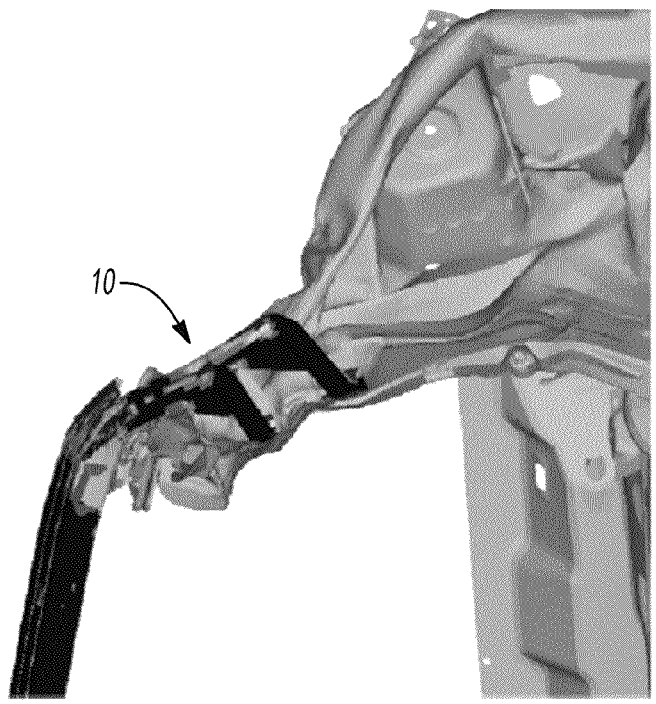
FIG. 7 is a bottom plan view of a SORB collision simulation of a vehicle equipped with a dual deflector tube formed of an aluminum tube wrapped with carbon fiber.
Figure 8:
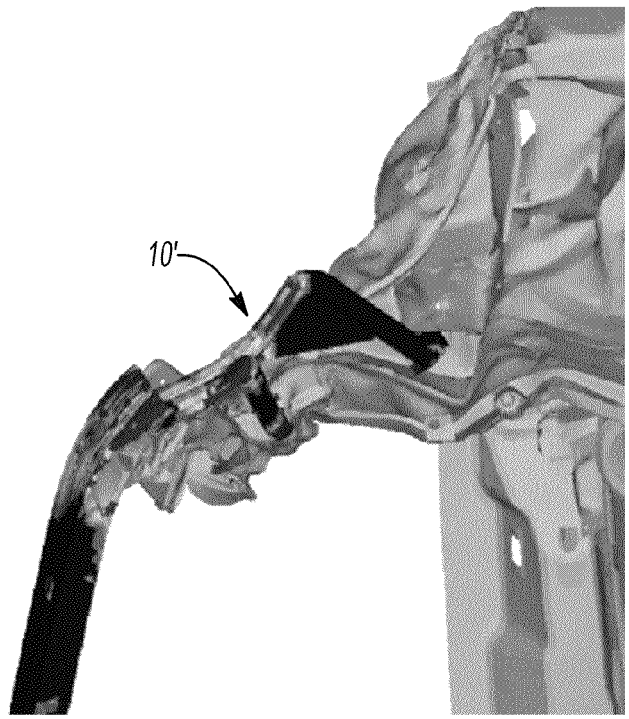
FIG. 8 is a bottom plan view of a SORB collision simulation of a vehicle equipped with a dual deflector tube formed of high-strength low-alloy steel (HSLA)

Referring to FIGS. 7 and 8, a deflector assembly 10 including an aluminum tube 52 having a carbon-fiber resin wrap layer 54 (as shown in FIG. 2) is shown at 45 milliseconds after initiation of a SORB test (as shown in FIG. 7). A high-strength, low alloy 550 (HSLA 550) steel deflector assembly 10' is shown in FIG. 8. FIGS. 7 and 8 are provided for comparison to show the effectiveness of the lightweight aluminum tube 52 with a carbon-fiber resin wrap layer 54 compared to a similar structure made of HSLA 550. In FIG. 7, there is less deformation of the deflector assembly 10 during the full impact. In comparison, the deflector illustrated in FIG. 8 shows an increased extent of deformation and a curved profile at 45 milliseconds into the SORB test.

Figure 9:
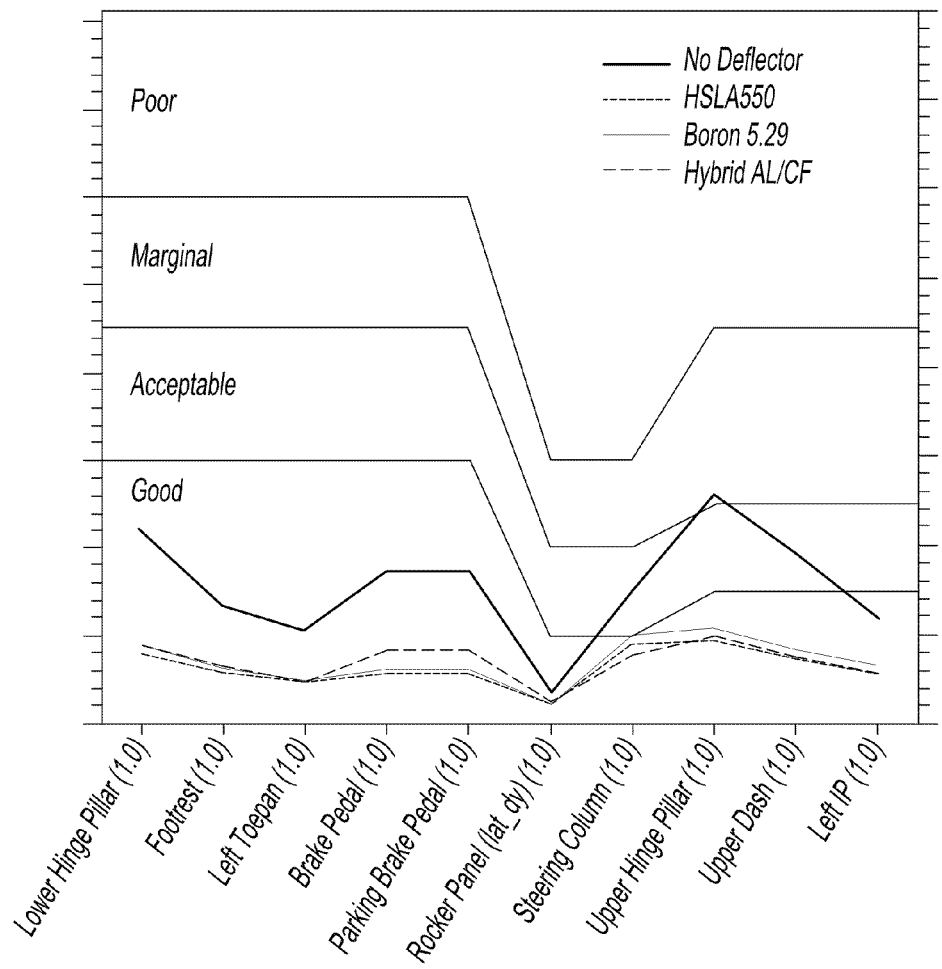
FIG. 9 is a graph showing the extent of intrusion at different locations into the passenger compartment of a base vehicle compared to a base vehicle with a dual deflector tube formed of an aluminum tube wrapped with carbon fiber compared to a dual deflector tube formed of high-strength low-alloy steel (HSLA), and a dual deflector tube formed of a boron alloy tube.

Referring to FIG. 9, a graph is provided of intrusions at various locations within the passenger compartment, including the lower hinge pillar, footrest, left toe pan, brake pedal, parking brake pedal, rocker panel, steering column, upper hinge pillar, upper dash and left IP. With no deflector, shown by a solid line, the intrusion is marginal at the upper hinge pillar in a SORB test. At deflector made of HSLA 550 is shown by the small dashed lines to provide intrusion measurements that were all within the good range. The boron deflector shown by the thinner solid lines also provided intrusion protection in the good range, but bordered marginal/acceptable in the steering column area. The hybrid aluminum/CF deflector assembly shown by long dashed lines provided intrusion protection in the good range as measured in a SORB test.

While exemplary embodiments are described above, it is not intended that these embodiments describe all possible forms of the disclosure. The words used in the specification are words of description rather than limitation. Changes may be made to the illustrated embodiments without departing from the spirit and scope of the disclosure as claimed. The features of the illustrated embodiments may be combined to form further embodiments of the disclosed concepts.

What is claimed is:

1. A deflector comprising:
a lower tube including a lower/front leg extending outboard from a bumper and an intermediate leg extending from a lower/outer end of the lower/front leg to an intermediate sliding plate; and
an upper tube including an upper/front leg extending outboard from the bumper and a rear leg extending from an upper/outer end of the upper tube to a rear sliding plate, the intermediate and rear sliding plates being configured to slide rearward.

2. The deflector of claim 1 wherein the lower/front leg and upper/front leg extend rearward from the bumper at an acute angle α relative to a frame rail.

3. The deflector of claim 1 wherein the intermediate leg is straight and the intermediate sliding plate is not attached to a frame rail, and wherein the rear leg is straight and the rear sliding plate is not attached to the frame rail.

4. The deflector of claim 1 wherein the lower/front leg is straight and the upper/front leg is straight.

5. The deflector of claim 1 wherein the lower tube includes a first aluminum tube that is reinforced with a first carbon-fiber wrap that covers the lower/front leg and the intermediate leg, and wherein the upper tube includes a second aluminum tube that is reinforced with a second carbon-fiber wrap that covers the upper/front leg and the rear leg.

6. The deflector of claim 1 wherein the lower tube and the upper tube each include an aluminum tube that is reinforced with a carbon-fiber wrap.

7. A front-end assembly for a vehicle comprising:
a frame rail;
a bumper disposed in front of the frame rail;
a deflector including a front leg attached to the bumper extending outboard from the bumper and a backing leg extending from an outer end of the front leg to a sliding plate adjacent the frame rail, wherein the front leg and backing leg are aluminum tubes that are covered with a carbon-fiber wrap; and
a lower tube including a lower/front leg attached to the bumper and an intermediate leg that has a first inner end unattached to the frame rail, and wherein the backing leg has a second inner end unattached to the frame rail.

8. The front-end assembly of claim 7 further comprising:
a generally triangular planar brace attached to the front leg and backing leg at an inside angle defined by the front leg and the backing leg.

9. The front-end assembly of claim 7 further comprising:
a sliding plate attached to a distal end of the backing leg that faces a point mobility bracket that is attached to the frame rail.

10. The front-end assembly of claim 7 further comprising:
a generally triangular planar brace attached to the lower/front leg and the intermediate leg at an inside angle defined by the lower/front leg and the intermediate leg.

11. The front-end assembly of claim 7 wherein the sliding plate is attached to a distal end of the intermediate leg that faces an outer mid-rail portion of the frame rail.

12. A method of making a SORB deflector comprising:
bending an aluminum tube to include a bumper attachment section, a front leg that extends rearward and outwardly from the attachment section to an outer end, and a backing leg that extends rearward from the outer end to a distal end;
welding a sliding plate facing a frame rail to the distal end
wrapping the aluminum tube with a carbon fiber reinforced resin layer; and
bending a lower aluminum tube to include a lower bumper attachment section, a lower/front leg that extends rearward and outwardly from the lower bumper attachment section to a lower/outer end, and an intermediate leg that extends rearward from the lower/outer end to a lower/distal end facing the frame rail;
welding a lower sliding plate to the lower/distal end;
wrapping the lower aluminum tube with a carbon fiber reinforced resin layer; and
assembling the lower aluminum tube to the aluminum tube.

13. The method of making the deflector of claim 12 further comprising:
welding an inner planar brace to an inside angle defined by the front leg and the backing leg.

14. The method of making the deflector of claim 12 further comprising:
welding a lower inner planar brace to an inside angle defined by the lower/front leg and the intermediate leg.

* * * * *